(No Model.)
H. E. RIDER.
ELECTRIC LIGHTER.
No. 562,775. Patented June 23, 1896.
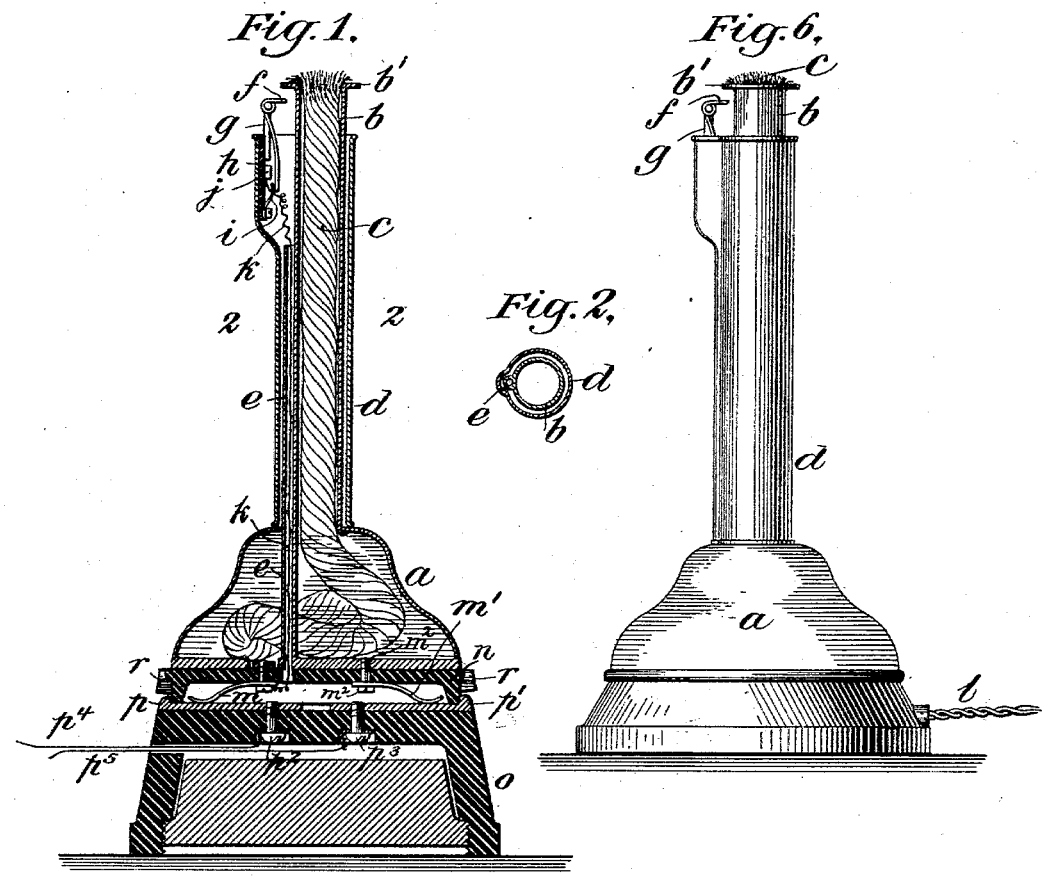
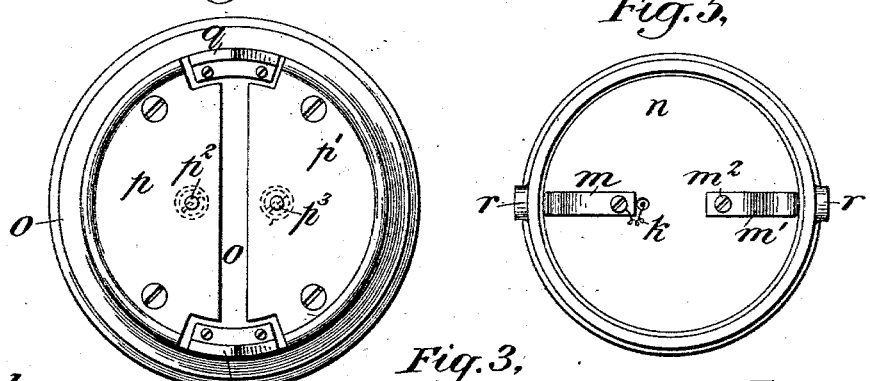
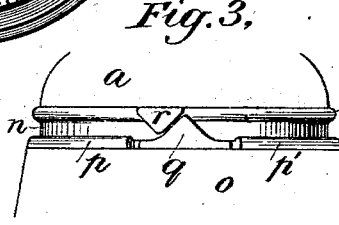
Witnesses:
O. H. Hayword
Charles G. Hook
Inventor:
Herbert E. Rider
by
Henry D. Williams
Attorney
ANDREW B.GRAHAM, PHOTO-LITHO. WASHINGTON, D.C.

UNITED STATES PATENT OFFICE.

HERBERT E. RIDER, OF BROOKLYN, NEW YORK, ASSIGNOR TO ROBERT W. INMAN, OF NEW YORK, N. Y.

ELECTRIC LIGHTER.

SPECIFICATION forming part of Letters Patent No. 562,775, dated June 23, 1896.

Application filed May 2, 1895. Serial No. 547,859. (No model.)

*To all whom it may concern:*

Be it known that I, HERBERT E. RIDER, a citizen of the United States, and a resident of the city of Brooklyn, county of Kings, State of New York, have invented certain new and useful Improvements in Electric Lighters, of which the following is a specification, reference being had to the accompanying drawings, forming part thereof.

This invention relates to devices for lighting or igniting, and is embodied in a device comprising a torch adapted to be taken up and carried by the hand of the user and to be used for lighting cigars or for other purposes, and means for electrically igniting said torch through the movement of taking it from its support. The torch comprises two parts movable relatively to each other, and one of the parts is adapted to be grasped by the hand of the user, and when the torch is lifted from its support the first movement does not affect the part not grasped by the hand of the user, and therefore this part remains at rest while the other part is moved away from the support, and in consequence of this relative movement of the parts an electric igniting device is actuated and lights the torch. When the limit of the relative movements of the parts has been reached, both parts move together and the torch as a whole may be carried about as desired.

My invention also includes a support of special construction whereby the torch is connected with the source of electric current when it rests upon said support and during the period when the part of the torch grasped by the hand of the user is being moved away from the support and the torch is being ignited, and with the improved construction employing this support the connecting wires or conductors running from the source of electric current terminate at the support, and the torch is not connected with the source of electric current otherwise than through the support, and when lifted clear of the support the torch is a detached part and may be carried about as desired; but to describe my invention more particularly I will now refer to the accompanying drawings, illustrating embodiments of my invention, in which—

Figure 1 is a vertical central section of a complete torch and support. Fig. 2 is a horizontal or cross section of the same on the line 2 2, Fig. 1. Fig. 3 is a part side elevation showing engaging projections of the torch and support, which projections prevent the torch being placed upon the support in improper position. Fig. 4 is a plan view of the support with the torch removed therefrom. Fig. 5 is an underneath plan view of the torch. Fig. 6 is a side elevation of a torch of modified construction directly attached to conducting-wires.

The torch is shown as composed of two parts movable relatively to each other, one part comprising a reservoir $a$ and upwardly-extending stem $b$, tightly secured to the reservoir or in one piece therewith, said stem terminating at its upper end in a lip or flange $b'$, and said reservoir and stem are hollow and may contain a suitable wick $c$ and an inflammable material saturating said wick, and the other part of said torch, movable relatively to the part $a\ b$, consists of the sleeve $d$, fitting loosely over the stem $b$, and free to slide upwardly from the position shown until stopped by contact of its upper end with the lip or flange $b'$ of the stem $b$. To prevent rotative movement of the sleeve $d$ relatively to the stem $b$, a rib projects from the side of the stem $b$, said rib being formed by a tube $e$, which tube is rigidly secured to the stem $b$ or formed in one piece therewith, and forms a conduit for an electric conducting-wire, as will be hereinafter described, and the sleeve $d$ is channeled to fit over said tube $e$, as clearly shown in Fig. 2.

For forming the electric spark and thereby igniting the torch, a yielding finger $f$ is mounted upon the sleeve $d$, being pivoted upon a pivot-piece $g$, extending upwardly from a block of insulating material $h$, said block $h$ being suitably secured at the upper end of the sleeve $d$, preferably within an enlargement thereof, as shown. This yielding finger $f$ has a horizontal arm arranged in such position that it will make and break contact with the rim or flange $b'$ of the stem $b$ when the sleeve $d$, carrying such finger $f$, is moved upwardly, and the yielding finger is coiled around its pivot pin or piece $g$ to increase its yielding and resilient action, and has a downwardly-extending arm, and this downwardly-extending arm of the finger $f$ is normally held in the position shown by a light spring $i$, and is thus normally out of contact with a stop $j$, but when in the upward movement of the sleeve $d$ the yielding finger comes in contact with the flange $b'$ of the stem $b$ the downwardly-extending arm of said yielding finger is brought in contact with said stop $j$, against the action of said spring $i$, and as such contact-stop $j$ is connected with one conductor of an electric circuit and the flange $b'$ is connected with the other conductor of such electric circuit, the electric circuit is closed through the horizontal arm of the yielding finger $f$; and when upon the further upward movement of the sleeve $d$ the yielding finger springs over the flange $b'$ and breaks contact therewith, an electric spark is formed, which will ignite the torch. When the sleeve $d$ moves downward from upper to lower position, the yielding finger is moved by the flange $b'$ still farther away from the contact-stop than in normal position, and thus the circuit is not closed and no spark results, and after passing the flange $b'$ in its downward movement the yielding finger $f$ returns by gravity to the normal position shown.

The electric connection from the contact-stop $j$ is made through a flexible insulated wire $k$, extending from said contact-stop $j$ downwardly through the tube or conduit $e$, and with sufficient slack between said stop and conduit to permit of the relative longitudinal movements of the two parts of the torch; and the tube $e$ is shown as extending down through the reservoir $a$ to the base or bottom of the reservoir, thus conducting said wire out below the bottom of the reservoir $a$ of the torch. In the construction shown in Fig. 6, in which the torch is connected by wires $l$ to the source of electric current, the same conducting-wire $k$, or another wire secured thereto, or to a post connected thereto, may form one of these conducting-wires $l$, running to the source of electric current; but in the construction shown in Figs. 1 to 5, inclusive, the conducting-wire $k$ is connected to a spring $m$, said spring $m$ being secured to an insulated bottom piece $n$, secured to the torch below the bottom of the reservoir, and said spring $m$ forming one contact-terminal of the torch.

The electric connection from the flange $b'$ is made through the metallic stem $b$ and reservoir $a$; and in the construction shown in Fig. 6 one of the wires $l$ is connected to this reservoir at any desired point; but in the construction shown in Figs. 1 to 5, inclusive, a spring $m'$ at the lower surface of the insulated bottom piece $n$ is electrically connected with the reservoir $a$ by its holding-screw $m^2$, and this spring forms the second contact-terminal of the torch.

In the construction shown in Fig. 6 the conducting-wires $l$ enter the bottom piece $a'$, attached to the reservoir $a$, or in one piece therewith, and may be connected in any suitable manner with the conductor $k$ and the metallic envelop of the torch. When this construction is employed, the torch is at all times connected with its support or with the source of electric current by the conducting-wires $l$ and cannot, therefore, be carried to a greater distance from its usual resting-place than is permitted by the length of the wires $l$. This construction, while well adapted for some uses, is not always desirable, as it is frequently advantageous to be able to carry the torch about freely, and to this end, in the construction shown in Figs. 1 to 5, inclusive, the electric connections are made through the support and the torch is a detached part, unconnected with the source of electric current, except when in contact with its support.

The support shown in Figs. 1, 3, and 4 may be held upon a bracket, or may rest upon a table or stand or battery-box, and is provided at its upper surface with two contact-plates $p$ and $p'$, which plates are insulated from each other, as by being held upon a bed of insulating material $o$, and are connected to the source of electric current, as through holding-screws $p^2$ $p^3$, respectively, and conducting-wires $p^4$ $p^5$, respectively, and these plates $p$ and $p'$ constitute the contact-terminals of the support; and, as shown, the springs $m$ and $m'$ at the bottom of the torch are in contact with these plates when the torch rests upon the support, the spring $m$ being in contact with the plate $p$ and the spring $m'$ in contact with the plate $p'$, so that the electric current may flow from the conducting-wires $p^4$ and $p^5$ through the plates $p$ and $p'$ and the springs $m$ and $m'$ to the spark-forming devices of the torch.

A slight rim is shown as formed around the outer margins of the plates $p$ and $p'$ to insure the placing of the base of the torch in proper relative circumferential position upon the support.

The electric connections will be established from the plates $p$ and $p'$ to the torch through the springs $m$ and $m'$ so long as the torch rests upon the support in such position that one of said springs is in contact with one of said plates and the other spring in contact with the other plate, and this will be true in whatever position the torch may be placed upon said support with its base within the rim of said support, except when at about right angles to the position shown or with the springs $m$ and $m'$ over the open space between the two plates $p$ and $p'$; and to prevent the torch from being placed upon the support in such position, I provide inclined or V-shaped guides or projections $q$ $q$, extending upward from the support at diametrically opposite points, and inclined projections $r$ $r$, extending laterally from the bottom of the torch in line with the springs $m$ and $m'$. The guides $q$ $q$ extend upward a sufficient distance to engage with the inclined projections $r$ $r$ in the event that an attempt is made to place the torch upon its support in a position at right angles to that shown; and the projections and guides will then come in contact with each other with the effect of slightly turning the torch and thus guiding it to a proper position or a position in which one spring $m$ or $m'$ will be in contact with one plate $p$ or $p'$, and the other spring with the other plate. In Fig. 3 the projection $r$ is shown in a position to which it would be guided as the result of an attempt to put the torch upon the support in improper position.

The operation of igniting the torch is effected by lifting the torch from its support, and to that end the sleeve $d$ is adapted to be grasped by the hand of the user and the other exposed portions of the torch are not of such shape as to be conveniently held in the hands, and the user will therefore grasp the sleeve $d$ and lift it away from the support; but the first movement of the sleeve $d$ will not cause any movement of the part of said torch including the reservoir $a$ and stem $b$, and this latter part of the torch will be retained by its weight in the position shown, and therefore the sleeve part $d$ will slide upward over the stem $b$, bringing the yielding finger $f$ into and out of contact with the flange $b'$, and thereby forming an electric spark and igniting the torch, as above set forth. When the upper end of the sleeve $d$ comes in contact with the flange $b'$, the relative movements of the parts will cease and they will remain in such position until the torch is again returned to place, and in placing the torch upon its support the reverse of the movement above described will take place or the sleeve $d$ will return by its own weight to the normal position shown, but no spark will be formed in this return movement, as the yielding finger $f$ will be moved away from its contact-stop $j$ by such return movement as above set forth.

The above describes the operation of the two constructions shown in the drawings. In the construction shown in Fig. 6 the torch may be set down anywhere upon a table or other support within the limit of the length of the conducting-wires $l$, but in the construction shown in Figs. 1 to 5, inclusive, the torch must be returned to the support from which it was removed or to another one of similar construction.

The springs $m$ and $m'$ are so constructed as to insure a slight downward movement when the torch is being lifted from the support, so as to continue the torch in electric circuit in the event of its being slightly tipped in the act of moving the sleeve $d$ upward relatively to the other part of the torch; but it will be seen that the spark-forming operation takes place before the stem $b$ and reservoir $a$ are lifted, and thus the torch is ignited before its bottom part leaves the support.

As above described, the weight of the reservoir part of the torch is relied upon to keep it stationary while the sleeve part is being moved upward by hand, and to this end it may be made of considerable weight or the action of gravity may be assisted by other forces, as by magnetism. It is of course evident that various modifications may be made in the construction above described, and shown in the drawings, within the purview of this invention, and that parts of my invention may be used separately, or in connection with other parts of different constructions.

What I claim, and desire to secure by Letters Patent, is—

1. A portable lighting-torch comprising two parts held together but having a limited movement relatively to each other, one of said parts being adapted to be grasped by the hand of the user, said parts being in normal position when the torch rests upon a support and being moved from such position when the torch is lifted from the support, and an electric igniting device operated by the relative movement of the parts to ignite the torch, substantially as set forth.

2. A portable lighting-torch comprising two parts, said parts being fitted together so as to have a limited movement relatively to each other, and one of said parts being adapted to be grasped by the hand of the user and said parts being moved from normal relative positions by the act of removing the portable torch from a rest or support, and an electric-spark-forming device actuated by such relative movement of the parts of the torch to ignite the torch, substantially as set forth.

3. A portable lighting-torch comprising two parts, said parts being fitted together so as to have a limited movement relatively to each other, one of said parts being adapted to be grasped by the hand of the user and said parts being moved from normal relative positions by the act of removing the portable torch from a rest or support, and a yielding electric-spark-forming finger carried by one of said parts in position to move into and out of contact with the other of said parts to ignite the torch upon relative movement of said parts in one direction, substantially as set forth.

4. A portable lighting-torch comprising two parts, said parts being fitted together so as to have a limited movement relatively to each other, and one of said parts being adapted to be grasped by the hand of the user, and the other of said parts containing electric contact-terminals, an electric-igniting device carried by said torch and actuated by the relative movement of the parts of the portable torch to ignite the torch, and a support for said portable torch containing contact-terminals of an actuating electric circuit, whereby said igniting device is connected with said actuating-circuit when the torch rests upon said support and during the movement away from said support of the part of the torch adapted to be grasped by hand, substantially as set forth.

5. A lighting-torch comprising two parts held together but having a limited movement relatively to each other, one of said parts being adapted to be grasped by the hand of the user, an electric-igniting device carried by said torch containing contact-terminals of an electric circuit, a support for said torch containing contact-terminals of an electric circuit, and engaging parts upon the torch and support so located as to prevent the torch from resting upon the support with the terminals in improper position, substantially as set forth.

6. A lighting-torch comprising a part adapted to be grasped by the hand of the user and another part movable relatively thereto, a support upon which the torch is adapted to rest, an electric-igniting device carried by said torch, two contact-terminals upon said torch connected with said igniting device and two contact-terminals upon said support connected with a suitable source of electric current, one set of said terminals being yielding and resilient, whereby said igniting device is connected with said circuit when the torch rests upon said support and during the movement away from said support of the part of the torch adapted to be grasped by hand, substantially as set forth.

7. A lighting-torch comprising two parts movable relatively to each other, one of said parts including a wick-holding device and the other part being adapted to be grasped by the hand of the user, and a yielding electric-spark-forming finger carried by the part adapted to be grasped by hand and held in position to move into and out of contact with the wick-holding part to ignite the torch upon relative movement of the parts away from normal position, substantially as set forth.

8. A lighting-torch consisting of two parts movable relatively to each other, one of said parts including a reservoir and wick-holding stem, and the other part including a sleeve free to move longitudinally upon said stem, and a yielding finger carried by said sleeve in position to move into and out of contact with the wick-holding part upon relative movement of said parts, and electric-circuit connections to said finger and to said wick-holding part, substantially as set forth.

9. In a lighting-torch, in combination, the reservoir $a$ and wick-holding stem $b$, and flange $b'$ on said stem $b$, the sliding sleeve $d$, the yielding finger $f$ carried by said sliding sleeve, the contact-stop $j$, said finger $f$ being normally out of contact with said stop $j$ but being brought into contact therewith and into and out of contact with the flange $b'$ upon upward movement of said sleeve $d$ relatively to said flange $b'$, and electric-circuit connections to said contact-stop $j$ and flange $b'$, substantially as set forth.

This specification signed and witnessed this 24th day of April, 1895.

HERBERT E. RIDER.

In presence of—
  E. L. PRENTISS,
  HENRY D. WILLIAMS.